Dec. 9, 1930.       T. P. PREIST       1,784,612
TESTING DEVICE FOR IMPULSE SENDERS
Filed Nov. 5, 1928       2 Sheets-Sheet 1
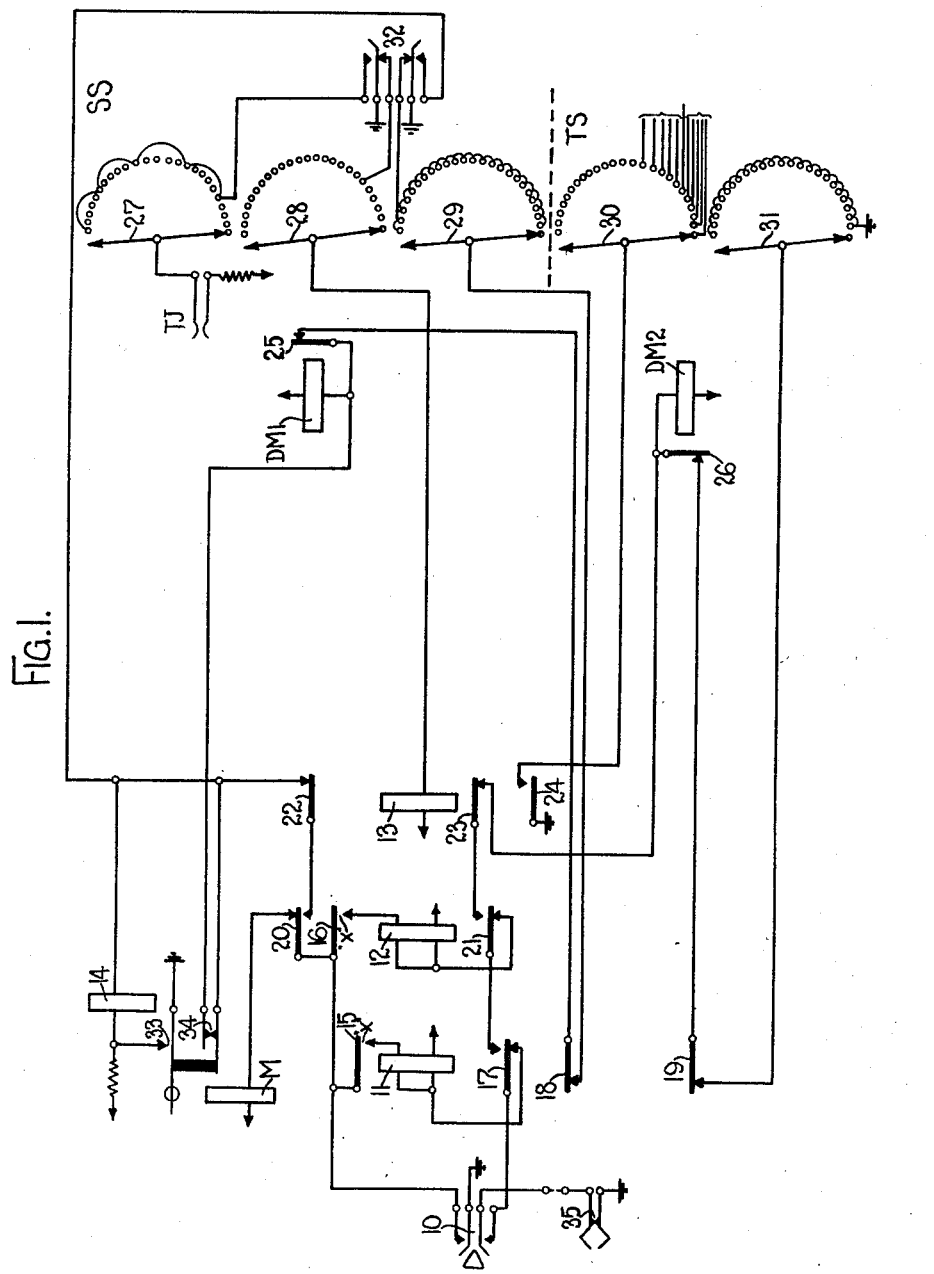
Inventor
Thomas Philip Preist

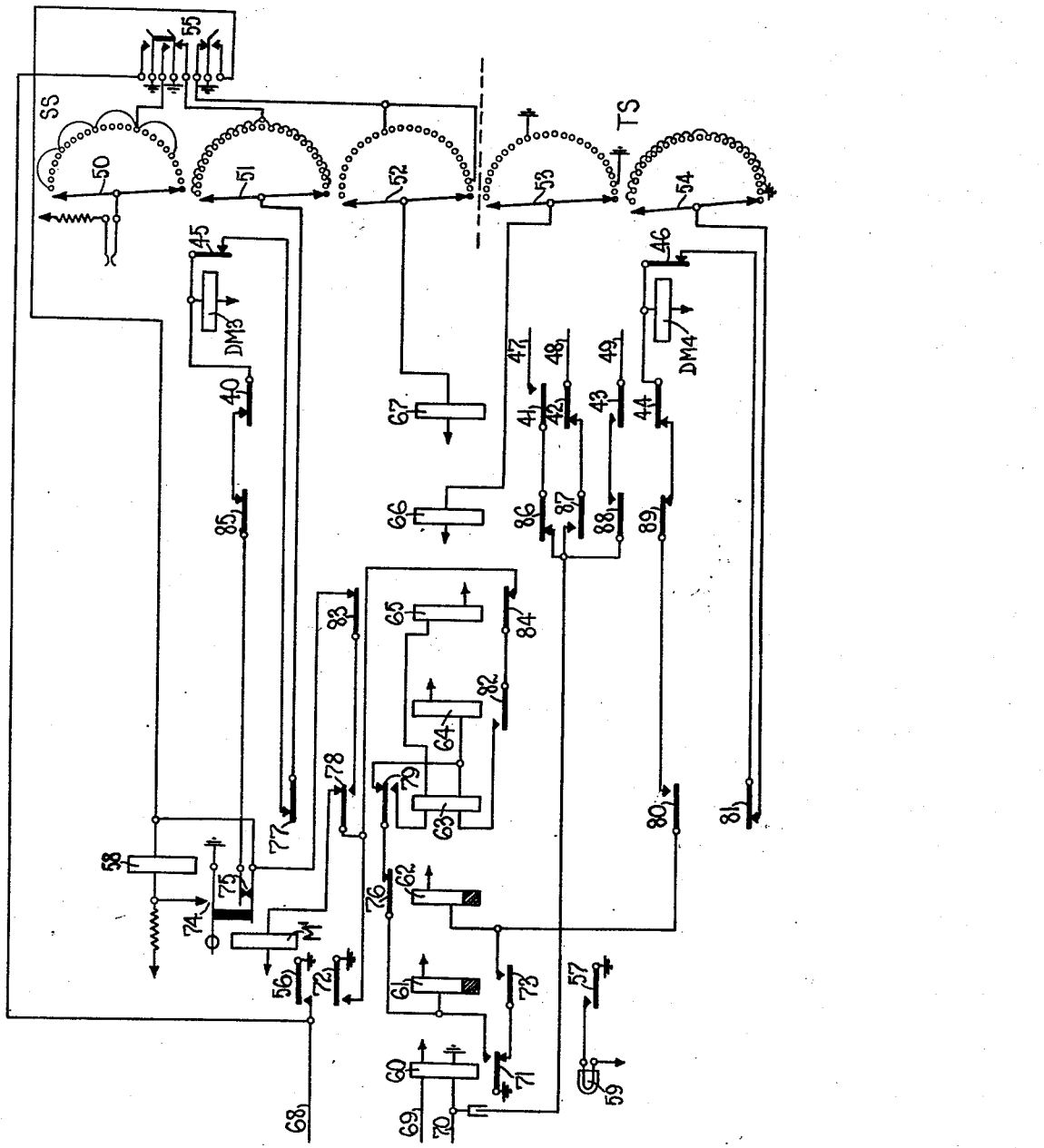

Patented Dec. 9, 1930

1,784,612

UNITED STATES PATENT OFFICE

THOMAS PHILIP PREIST, OF CHESHIRE, ENGLAND, ASSIGNOR TO ASSOCIATED TELEPHONE AND TELEGRAPH COMPANY, OF KANSAS CITY, MISSOURI, A CORPORATION OF DELAWARE

TESTING DEVICE FOR IMPULSE SENDERS

Application filed November 5, 1928, Serial No. 317,231, and in Great Britain November 30, 1927.

The present invention relates to testing arrangements for checking the speed of impulse senders of the type used in automatic telephone systems, and more particularly impulse senders commonly known as dial switches by which a subscriber is enabled to control automatic switches himself. It is well understood that the switches which have to respond to the impulses will only function correctly if impulses are received at a rate which must lie within certain limits, and it is therefore desirable to have a ready means of checking that after a period of heavy duty and possible rough usage any particular impulse sender shall actually transmit impulses at a rate lying between these limits. The invention provides a simple and accurate means for doing this and includes an arrangement whereby a dial switch may be tested as installed at a subscriber's premises without dismantling any of the apparatus or requiring the assistance of anyone at the exchange.

According to one feature of the invention, the impulse sender under test and a standard impulse sender are started simultaneously to send impulses to operate two stepping switches so that the difference in the positions of the two switches after a predetermined time will be a measure of the required impulse speed.

According to another feature of the invention in an arrangement for testing the speed of subscribers' dial switches as used in automatic telephone systems, in response to the dialling of a special number connection is established with the test device, the subsequent dialling of a particular digit serving to effect a test of the dial switch, while the dialling of a further digit restores the test device to normal in readiness for a further test.

These features will be better understood from the following description of two methods of carrying the invention into effect which should be taken in conjunction with the accompanying drawings. It will be understood however, that various detail modifications to the arrangements shown could be made by those skilled in the art without exceeding the scope of the invention. The arrangement illustrated in Fig. 1 is designed to test impulse senders adapted to send more than ten impulses in a series, while the arrangement of Fig. 2 is a test device suitable for the testing of dial switches from a distant point such as the substation at which they are installed. In both cases the standard impulse sender is of the weighted pendulum type having contacts arranged to short-circuit its winding when the vibrating member is fully attracted. This type is chosen for its insensitiveness to voltage variations and accurately constant speed and for the facility with which it may be started operating in synchronism with the device under test.

Referring first to Fig. 1, the impulse sending device required to be checked is connected to the start key 10 as shown at 35 and the key is then operated. Depression of the start key 10 connects earth to the locking armatures 15 and 16 of two-step relays 11 and 12, and also energizes the locking magnet M which operates and attracts the armature of the vibrating relay 14 to hold it at the break portion of its impulse and to ensure that when released it shall start with a full swing at its correct speed. The start key 10 also connects earth impulses from the device under test to the lower winding of two-step relay 11 which closes its light armature 15, thereby short-circuiting its second winding till the impulse springs break. When this occurs relay 11 operates fully, and at armature 17 prepares the circuit of two-step relay 12 and at armatures 18 and 19 opens the homing circuit of the driving magnets DM1 and DM2 over wipers 29 and 31 respectively. The second earth impulse partially energizes relay 12 which operates its light armature 16, and when the impulse springs break energizes fully and operates its armatures 20 and 21. At armature 20 the circuit of magnet M is broken and the operating circuit of the vibrator relay 14 completed, and at armature 21 the impulses from the device under test are connected to the driving magnet DM2 of the switch TS.

It will thus be seen that since relay 12 operates at the commencement of the break pulse on the impulse sender under test and releases the vibrator, also at the commencement of a break pulse, the two sets of impulses are initially synchronized. The two rotary switches are now stepped forward in response to the impulses being delivered to them, for the switch SS from springs 34 of the standard vibrator and for the switch TS from the device under test. When the switch SS has made 20 steps, its wiper 28 finds earth over the springs of the test key 32 and a circuit is completed to energize stop relay 13. Relay 13 upon operating, at armatures 22 and 23 opens the stepping circuits of magnets DM1 and DM2 respectively and at armature 24 connects earth to wiper 30 of the switch TS and hence over the bank contact to the appropriate indicating lamp. If the two switches have kept in synchronism, switch TS will also be on contact 20 and the "speed correct" lamp will be lit, but if the switch TS driven by the device under test has lost or gained on switch SS a lamp showing such loss or gain within the prescribed limits will be lit.

Since in the arrangement shown, twenty impulses are taken from the device and the error is cumulative, variations from normal of half a pulse in ten may be shown. By taking a larger number of impulses, for instance and preferably using a switch with a 50-point bank, errors of ¼ pulse in ten can be discerned.

Release the start key 10 disconnects the impulse device under test, and by removing the locking earth from relays 11 and 12 allows them to restore, the homing circuits for returning the two switches to normal position being then completed over armatures 18 and 19 and interrupter springs 25 and 26.

To check the speed of the standard vibratory impulser, a telephone is inserted in the test jack TJ of rotary switch SS and the speed test key 32 is thrown. Earth is disconnected from the banks of the rotary switch SS to prevent it homing and to prevent relay 13 operating. The vibrator relay 14 is energized and the magnet DM1 steps the wipers round the bank continuously. Every 5 impulses earth will be connected from the key 32 over bank and wiper 27, telephone, resistance to battery, giving a click in the receiver at each connection. When the vibrator is correctly adjusted there will be 120 such clicks in one minute. This method provides a ready means of checking the vibrator speed. The operation of switch SS continues until the key 32 is released whereupon conditions are restored to normal.

Referring now to Fig. 2, this shows the circuit arrangement for adapting the impulse testing equipment to the testing of subscribers' dial switches from the substation. This equipment is reached over the normal exchange selectors in response to the dialling of a special number which would probably be known only to the faultsman. When the equipment shown is connected with, the line loop will energize line relay 60 which in turn at armature 71 energizes guard relay 61. Relay 61 upon operating, at armature 56 earths the release trunk conductor 68 to hold the preceding switches operated, at armature 72 energizes the magnet M' to lock the vibrator in an extreme position, at armature 73 prepares the impulsing circuit and at armature 57 lights the lamp 59 to indicate that the equipment is in use. At armature 71 moreover a circuit is completed for relay 64 over armatures 76 and 79 and relay 64 at armature 82 connects relays 63 and 64 to earth at armature 72. Relay 63 cannot yet operate however as its lower winding is shunted by earth from armature 71.

The faultsman now dials 0 and line relay 60 responds by de-energizing ten times. On its first restoration it removes the shunt from relay 63 which immediately operates and by opening the circuit of magnet M' at armature 78 releases the vibrator, at armature 79 prepares a circuit for relay 65, at armatures 77 and 81 opens the homing circuits of the switches SS and TS respectively, and at armatures 78 and 80 completes the circuits of the driving magnets DM3 and DM4 to the vibrator and impulsing relay 60 respectively. Relays 63 and 64 are now held in series over armatures 82 and 84 to earth at armature 72. A circuit to operate relay 62 is also completed over the back contacts 71 of impulsing relay 60 and front contacts 73 of guard relay 61, and relay 62 maintains the circuit of relay 65 open at armature 76.

As soon as ten impulses have been completed by the calling device or the standard vibrator, or both if they are in synchronism, one or both of relays 66 and 67 will energize over wipers 52 and 53. The operation of either of these relays will open both magnet circuits at armatures 85, 89, 40 and 44 thereby preventing further rotation of the switches SS and TS. If the dial switch is slow, switch SS will reach its tenth contact first and relay 67 will operate and at armature 41 connect a low tone from conductor 47 to the line. On the other hand, if the dial switch is fast, switch TS will reach its tenth contact first and relay 66 will operate, thereby at armature 87 connecting a high tone from conductor 48 to the line. If the dial speed is correct however, relays 66 and 67 operate together and an intermittent tone from conductor 49 is applied to line over armatures 43 and 88.

Should the dial speed be incorrect, the faultsman after making the necessary adjustment dials another digit, for instance 1. When relay 60 came to rest in the operated condition after 0 had been dialled, relay 62 released after its slow period and completed a circuit from earth, armatures 71, 76, 79, upper winding of relay 63, winding relay 65 to battery. Relay 65 upon operating, at armature 84 opens the circuit of relays 63 and 64, whereupon relay 64 releases but relay 63 is maintained operated over its upper winding in series with relay 65. The release of impulse relay 60 when the second digit is dialled opens the circuits of relays 63 and 65 which release, the operation of relay 62 preventing the re-operation of relay 65 should a digit greater than 1 be dialled. The homing circuits for the driving magnets DM3 and DM4 are now completed and the switches SS and TS will return to their normal position, the equipment being then ready to make a retest of the dial speed in response to the dialling of the further digit 0.

Means similar to those shown in Fig. 1 are provided for checking the vibrator impulse speed and it will be noted that the release trunk conductor 68 is guarded as long as the vibrator speed test key 55 is in operated position.

If desired a timing device comprising for instance a relay group can be incorporated so as to obviate the necessity for a second digit to be dialled to reset the test equipment. In this case the removal of tone from the line would indicate to the faultsman that the testing apparatus was again in condition to receive the test digit 0.

What I claim as new and desire to secure by Letters Patent is:—

1. In an impulse speed-testing mechanism for telephone systems, an impulse sender to be tested, a standard impulse sender, a separate stepping switch controlled by each of said senders, means for operating both of said senders simultaneously to step their associated switches, means responsive to a predetermined time interval for stopping said switches, and means for measuring the required impulse speed by determining the difference in the positions of said switches.

2. In an impulse speed-testing mechanism for telephone systems, an impulse sender to be tested, a standard impulse sender, a separate stepping switch controlled by each of said senders, means for operating both of said senders simultaneously to step their associated switches, means for stopping said switches when one of them reaches a definite position, and means determined by the position of the other of said switches for measuring the required impulse speed.

3. In an impulse speed-testing mechanism for telephone systems, an impulse sender to be tested, a standard impulse sender, a separate stepping switch controlled by each of said senders, means for operating both of said senders simultaneously to step their associated switches, means responsive to a predetermined time interval for stopping said switches, means for measuring the required impulse speed by determining the difference in the positions of said switches, and a key in said testing mechanism for controlling only said standard impulse sender to operate its associated stepping switch, and means in said stepping switch for audibly checking the speed of said standard impulse sender.

4. In an impulse speed-testing mechanism for telephone systems, an impulse sender to be tested, a standard impulse sender, a separate stepping switch controlled by each of said senders, means for operating both of said senders simultaneously to step their associated switches, means responsive to the operation of either of said switches a predetermined number of steps for stopping their movement, and means for measuring the required impulse speed by determining the difference in the positions of said switches.

5. In an impulse speed-testing mechanism for telephone systems, an impulse sender to be tested, a standard impulse sender, a separate stepping switch controlled by each of said senders, means for operating both of said senders simultaneously to step their associated switches, means responsive to a predetermined time interval for stopping said switches, means for measuring the required impulse speed by determining the difference in the positions of said switches, and means whereby the switch controlled by said standard impulse sender always makes the same number of steps.

6. In an impulse speed-testing mechanism for telephone systems, an impulse sender to be tested, a standard impulse sender comprising a weighted vibrator held in an extreme position, a separate stepping switch controlled by each of said senders, means for operating both of said senders simultaneously to step their associated switches, means responsive to the transmission of the first impulse from said sender under test for releasing said weighted vibrator, means for stopping said switches when one of them reaches a definite position, and means determined by the position of the other of said switches for indicating the impulse speed of the impulse sender under test.

7. In an impulse speed-testing mechanism for telephone systems, an impulse sender to be tested, a standard impulse sender, a separate stepping switch controlled by each of said senders, means for operating both of said senders to simultaneously transmit impulses to their associated switches to operate them, means for stopping both of said switches when the switch controlled by said standard sender reaches a definite position, and means controlled by the switch that is operated by the sender under test for operating a signal to indicate the difference in speed between said senders.

8. In an impulse speed-testing mechanism for telephone systems, an impulse sender to be tested, a standard impulse sender, a separate stepping switch controlled by each of said senders, a start key for connecting said senders with their associated switches, means for operating both of said senders to simultaneously transmit impulses to their associated switches to operate them, means for stopping both of said switches when the switch controlled by said standard sender reaches a definite position, means controlled by the switch that is operated by the sender under test for operating a signal to indicate the difference in speed between said senders, and means responsive to the release of said start key for automatically restoring said switches to normal.

In testimony whereof I have signed my name at Liverpool, England, this 17th day of October, 1928.

THOMAS PHILIP PREIST.